Nov. 19, 1935. H. E. YOUNG 2,021,216
MULTIPHASE CURRENT REGULATOR
Filed June 29, 1934 2 Sheets-Sheet 1
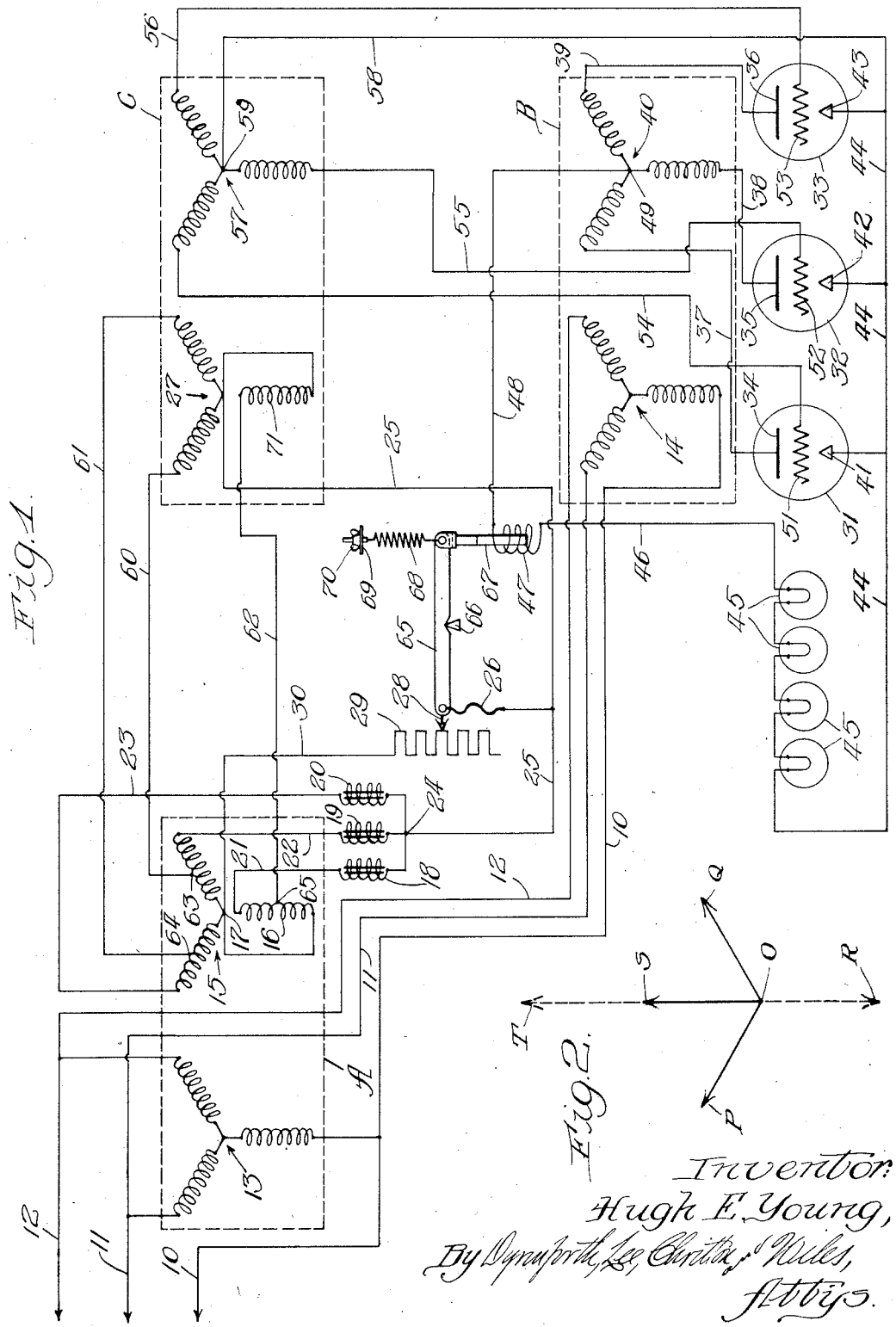
Inventor:
Hugh E. Young,
By Dynaforth, Lee, Chritton & Wiles,
Attys.

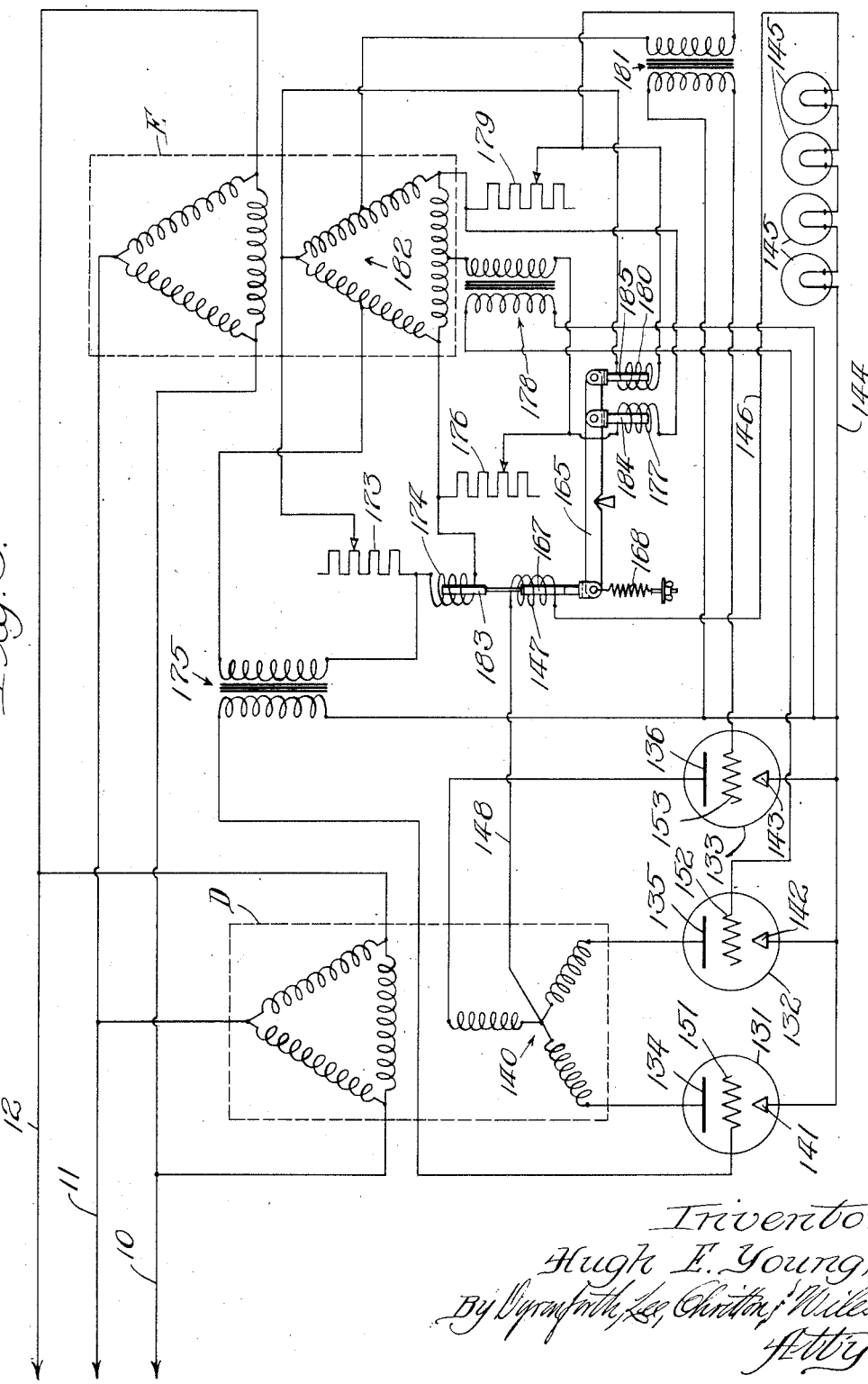

Patented Nov. 19, 1935

2,021,216

UNITED STATES PATENT OFFICE 2,021,216

MULTIPHASE CURRENT REGULATOR

Hugh E. Young, Chicago, Ill.

Application June 29, 1934, Serial No. 733,096

8 Claims. (Cl. 175—363)

This invention relates to current regulators and more particularly to regulators designed to maintain constant a D. C. current supplied from a multi-phase line.

This application is a continuation in part of my application on Current controlling apparatus, Serial No. 618,369, filed June 20, 1932.

One feature of this invention is that it supplies a D. C. load, as for example a series street lighting system, with current from a balanced multi-phase system, as for example the usual commercial three-phase line; another feature of this invention is that it operates automatically to maintain the current through said load constant; still another feature of this invention is that it maintains a balanced condition in the multi-phase supply line; yet another feature of this invention is that it controls the current supply by a single means; another feature is that the D. C. current is controlled through the action of a phase splitting circuit in combination with controlled arc rectifying tubes; other features and advantages will appear from the following specification, and the drawings, in which—

Fig. 1 is a diagrammatic view of this invention as employed to supply a series street lighting system from a balanced three-phase circuit; Fig. 2 is a vector diagram of the currents in the transformer supplying the phase-splitting circuit; and Fig. 3 is a diagrammatic view of this invention employing a multiplicity of phase-splitting circuits.

There are many advantages to be gained by operating a D. C. load on rectified current obtained from a balanced multi-phase system, rather than from a single phase line. The usual commercial power supply today is in the form of three-phase circuits, and where it is desired to draw heavy currents it is best to do so from the full three-phase system, since to place a heavy load across two lines only will unbalance the system and result in power distribution difficulties. Moreover, rectified D. C. from a multi-phase system is more nearly a true D. C., and loses much of its pulsating characteristic which tends to introduce inductance difficulties not found in true D. C. load systems. While the particular embodiment illustrated herewith shows the operation of a series lighting system from a three-phase supply, the same fundamental circuit could be used in connection with any multi-phase system, as for example a commercial six-phase installation. Moreover, although a series lighting system is shown as a load, any load through which it is desired to pass a constant average D. C. current may be substituted in this circuit. This system can, for example, be employed to feed a battery charging line, or a chemical electrolytic process through which a constant current is desired. Even when the load consists of a series street lighting circuit it is not limited to filament lamps, as illustrated here, but may be used for a line having sodium vapor lamps thereon, or a combination of vapor lamps and filament lamps.

In the particular embodiment illustrated in Fig. 1, the three-phase supply line is indicated by the numerals 10, 11 and 12. This line has connected thereto the primaries 13 and 14 of the two multi-phase transformers indicated in general as A and B. In addition to these a grid transformer, indicated as C, is used.

The secondary 15 of the transformer A supplies energy to the phase splitting circuit. This secondary is star-connected, and has one branch 16 reversed with respect to the neutral point 17. The advantages of this reversal will be considered in connection with the description of Fig. 2. The ends of each of the three branches of this secondary 15 are connected to inductance coils 18, 19 and 20, respectively, by the leads 21, 22 and 23. These three inductances are connected together at the common point 24 from which a lead 25 runs to the flexible lead 26 and to the center point of the primary 27 of the grid transformer C. The flexible lead 26 connects to a moving contact 28 of the resistance 29, from which a return lead 30 is provided back to the center point 17 of the secondary 15.

Controlled arc rectifying tubes 31, 32 and 33 have their respective anodes 34, 35 and 36 connected by the leads 37, 38 and 39 to the ends of the star-connected secondary 40 of the power supply transformer B. The cathodes 41, 42 and 43 of these tubes are all connected to the common lead 44, which passes the current through the load, illustrated here as lamps 45. The lead 46 provides a return circuit from the load through the solenoid 47 and the lead 48 to the center tap 49 of the secondary 40 of the power transformer B.

Control of the current through the tubes is achieved in this form by the grids 51, 52 and 53 which are connected by the leads 54, 55 and 56 to the ends of the star-connected secondary 57 of the grid transformer C. A grid return circuit is provided by the lead 58 running from the center point 59 of this secondary to the common cathode lead 44. Changes in the current through the primary 27 of the transformer C are reflected on the grids 51, 52 and 53 through the secondary 57, and the phase of the grid voltage may thus be shifted with respect to the voltage on the anodes of the tubes by shifts of current in the primary 27.

The ends of the primary 27 are connected by the leads 60, 61 and 62 to intermediate points 63, 64 and 65 on the branches of the star-connected secondary 15. Voltages developed in the secondary 15 are impressed across the inductances 18, 19 and 20, and also across the resistance 29. A common return for these various branches is provided by the lead 25 to the center point of the transformer primary 27, and thence back by the leads 60, 61 and 62 to the secondary 15. Variations in the relation between these voltage drops will produce a shift in the phase of the current flowing in the transformer primary 27, and thus achieve control of the grids.

Automatic control of the relation of the voltages in the phase splitting circuit is provided by mounting the contact arm 28 on one end of a lever 65 pivoted about the point 66. The other end of this lever has depending therefrom a core 67 adapted for movement into or out of the solenoid 47. At this same end, and opposing the pull of the solenoid on the core 67, is a spring 68 fastened to some fixed point 69 by adjustable means 70.

When the spring 68 has been adjusted to the tension necessary to just balance the pull of the solenoid 47 at the desired D. C. load current the core 67 will not move unless there is a change in current through the solenoid 47. Should the load current, and thus the solenoid current, decrease the spring 68 will tend to pull the core out of the solenoid and thus move the lever 65 about its pivot point 66 to effect a movement of the contact arm 28, which will change the amount of resistance in the phase splitting circuit. This change will cause a shift in the phase of the current through the primary 27, which change will be reflected in the control grids 51, 52 and 53, and will increase the amount of current passed by the tubes in order to restore the load current to the desired level. On the other hand, should the load current tend to rise the above action will be reversed, the increased current through the solenoid 47 tending to pull down the core 67, and thus the tubes will be rendered operative over a smaller portion of each cycle in order to restore the current to normal. It is thus seen that the current through the load, here shown as the street lights 45, will remain constant irrespective of the changes in resistance in the load circuit itself. Any number of lamps may be thrown into or out of the circuit, or may be automatically shorted out upon lamp failure by the operation of a short circuiting relay, without affecting the level of the current through the system. Since control is achieved by means of controlled arc rectifying tubes substantially no losses are introduced into the system by the control means.

Fig. 2 illustrates the effect of the reversal of the branch 16 of the secondary 15, and the corresponding reversal of the branch 71 of the secondary 27. Were these branches to be connected normally the currents therein would be illustrated by the vectors OP, OQ and OR. These vectors would be in balanced relationship, and there would therefore be no flow of current at the neutral point O, or, in other words, no flow or current through the lead 30 and the resistance 29. If there were no current flow therein changes in the resistance effected by the movement of the contact arm 28 would not change the voltage relations in the phase splitting circuit. By reversing the branches 16 and 71, however, the currents are now illustrated by the vectors OP, OQ, and OS. This arrangement will give a resultant neutral current illustrated by the vector OT. This neutral current is large enough to render changes in the resistance 29 effectual in the operation of the phase splitting circuit.

In the embodiment of Fig. 3 current is supplied by lines 10, 11 and 12 to the power transformer D and the phase splitting circuit transformer E. The star-connected secondary 140 supplies the anodes 134, 135 and 136 of the controlled arc rectifying tubes 131, 132 and 133. Power is passed through the cathodes 141, 142 and 143 by the common lead 144 to the load 145 and is then returned by the lead 146 through the solenoid 147 and the lead 148 to the center point of the secondary 140. In this particular embodiment, however, a phase splitting circuit is provided for each of the three grids 151, 152 and 153. The resistance 173, the inductance 174, and the single phase transformer 175 supply the grid 151; the resistance 176, the inductance 177, and the transformer 178 feed the grid 152; and the resistance 179, the inductance 180, and the transformer 181 feed the grid 153. All of these phase splitting circuits receive their power from the secondary 182 of the transformer E. In this particular embodiment variations in the voltage relation in the phase splitting circuits are achieved through the movement of cores 183, 184, and 185 in the inductances 174, 177, and 180. All of these cores are connected to the lever 165 and derive their motion through movements of the lever depending upon the respective pulls of the solenoid 147 on the core 167 and that of the spring 168. The automatic control action of this circuit is similar to that discussed in connection with the circuit of Fig. 1.

It is to be understood that one of the main features of this circuit is the shift of the voltage relation in the phase splitting circuit, and that this can be achieved through variations in the ohmic value of the inductances, the resistances, or by any means which varies the relationship of the voltage drops across them. Moreover, the particular delta-star combinations shown in the transformers may be varied, as is shown by the fact that one set of combinations is used in Fig. 1 and another in Fig. 3.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. Apparatus of the character described, including; a source of multi-phase alternating current; multi-phase rectifying means deriving its power from said source and comprising a plurality of anodes and associated control means; a direct current load circuit supplied with current by said rectifying means, the resistance of said circuit being adapted to vary from maximum value to substantially short circuit value; a phase splitting circuit whereby the phase of the voltages on the control means of said rectifying means may be shifted with respect to that on the anodes of said rectifying means through substantially 180 electrical degrees; and means whereby changes in the current through the load affect the phase splitting circuit to restore the load current to a desired constant value.

2. Apparatus of the character described, including; a source of three-phase alternating current; multi-phase controlled arc rectifying tube means supplied by said source; a direct current load circuit fed by said tube means, the resistance of said circuit being adapted to vary from maximum value to substantially short circuit value; a phase splitting circuit whereby control of the current passed by said tube means is achieved; a solenoid in series with said load; and means whereby variations in the current through said solenoid effect variations in the phase splitting circuit to restore the current through said load to a desired constant value for all variations of resistance in said load circuit between said predetermined maximum value and substantially short circuit value.

3. Apparatus of the character described, including; a source of three-phase alternating current; multi-phase controlled arc rectifying tube means supplied by said source; a direct current load circuit fed by said tube means, the resistance of said circuit being adapted to vary from maximum value to substantially short circuit value; a solenoid in series with said load, said solenoid having a movable core therein; a phase splitting circuit having inductance and resistance branches; and means whereby variations in current through said solenoid affect one of said branches to restore the current through said solenoid to a desired constant value for all variations of resistance in said load circuit between said predetermined maximum value and substantially short circuit value.

4. Apparatus of the character described, including; a source of three-phase alternating current; controlled arc rectifying tubes supplied by said source; a direct current load circuit fed by said tubes, the resistance of said circuit being adapted to vary from maximum value to substantially short circuit value, said load circuit having a solenoid therein; a phase splitting circuit having inductance and resistance branches, and means whereby voltages developed in said phase splitting circuit are applied to the control means of said tubes; and means whereby changes in current through said solenoid effect changes in the voltage relationships between the branches of said phase splitting circuit to keep the current in said load circuit constant for all variations in resistance of said load circuit between said predetermined maximum value and substantially short circuit value.

5. Apparatus of the character described, including; a source of three-phase alternating current; controlled arc rectifying tubes supplied from said source; a direct current load circuit fed by said tubes, said circuit having a solenoid therein; a phase splitting circuit having a plurality of inductance branches and a single resistance branch; means whereby the voltages developed in said phase splitting circuit are applied to the control means of the respective tubes; and means whereby variations in current through said load affect said resistance branch to restore the current through said load circuit to a constant value.

6. Apparatus of the character described, including; a source of three-phase alternating current; controlled arc rectifying tubes supplied from said source; a direct current load circuit fed by said tubes; a phase splitting circuit, said phase splitting circuit having an inductance and a resistance branch for each of said tubes; and means whereby the voltages developed in each of these inductance-resistance combinations is applied to the control means of the respective tubes; and means whereby current variations in the load circuit are translated into mechanical motion to effect variations in each of said inductance branches whereby the current through said load circuit is restored to normal.

7. Apparatus of the character described, including; a source of three-phase alternating current; controlled arc rectifying tubes supplied from said source; a direct current load circuit fed by said tubes; a transformer having its primary connected to said source of three-phase current, and having a star-connected secondary; a phase splitting circuit having three branches supplied from the ends of said star-connected secondary, and a single branch connected to the center point of said secondary; a solenoid in series with said load, said solenoid having a movable core therein; and means whereby current variations in said solenoid effect changes in said single branch of the phase splitting circuit.

8. Apparatus as claimed in claim 7, wherein one of the branches of said star-connected transformer secondary is reversed with respect to the neutral point of said secondary.

HUGH E. YOUNG.